(12) United States Patent
Hanson et al.

(10) Patent No.: US 11,945,403 B2
(45) Date of Patent: Apr. 2, 2024

(54) PROGRESSIVE LOCKOUT POLICY FOR DEVICELESS VEHICLE ACCESS AND REMOTE LOCKOUT MANAGEMENT INTERFACE

(71) Applicant: FORD GLOBAL TECHNOLOGIES, LLC, Dearborn, MI (US)

(72) Inventors: Ryan Edwin Hanson, Livonia, MI (US); Ali Hassani, Ann Arbor, MI (US); Hemanth Yadav Aradhyula, Farmington Hills, MI (US); John Robert Van Wiemeersch, Novi, MI (US); Hamid Golgiri, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 620 days.

(21) Appl. No.: 17/145,808

(22) Filed: Jan. 11, 2021

(65) Prior Publication Data
US 2022/0219643 A1 Jul. 14, 2022

(51) Int. Cl.
*B60R 25/25* (2013.01)
*B60R 25/102* (2013.01)
(Continued)

(52) U.S. Cl.
CPC .......... *B60R 25/25* (2013.01); *B60R 25/102* (2013.01); *B60R 25/302* (2013.01); *B60R 25/31* (2013.01);
(Continued)

(58) Field of Classification Search
CPC ..... B60R 25/25; B60R 25/102; B60R 25/302; B60R 25/31; B60R 25/305; G06F 21/32;
(Continued)

(56) References Cited

U.S. PATENT DOCUMENTS 10,303,866 B1    5/2019  Van Os et al.
10,755,508 B2    8/2020  Ghorpade et al.
(Continued)

OTHER PUBLICATIONS

Grasdal et al, Account Lockout Policy, 2003 (Year: 2003).*
(Continued)

*Primary Examiner* — Alan D Hutchinson
(74) *Attorney, Agent, or Firm* — Frank Lollo; Brooks Kushman P.C.

(57) ABSTRACT

A vehicle for improved user authentication is provided. The vehicle includes a biometric sensor; and a controller programmed to initiate a biometric authentication of a user within a vicinity of a vehicle using data received from the biometric sensor, and responsive to occurrence of a secondary trigger condition initiated by the user to gain access to the vehicle, complete the authentication to grant or deny access to the user. A system for remote management of lockout states for a vehicle is provided. A server is programmed to receive a lockout notification from the vehicle, responsive to occurrence of a failed access attempt using an access modality, the lockout notification including contextual information with respect to the occurrence of the failed access attempt; and send, responsive to the lockout notification, an indication of an administrative action to be performed by the vehicle.

20 Claims, 6 Drawing Sheets

(51) Int. Cl.
    *B60R 25/30*     (2013.01)
    *B60R 25/31*     (2013.01)
    *G06F 21/32*     (2013.01)
    *G06V 40/16*     (2022.01)

(52) U.S. Cl.
    CPC ............ *G06F 21/32* (2013.01); *G06V 40/172* (2022.01); *B60R 25/305* (2013.01)

(58) Field of Classification Search
    CPC .. G06F 9/452; G06V 40/172; G07C 9/00309; G07C 9/00563; G07C 9/00896
    See application file for complete search history.

(56) References Cited

U.S. PATENT DOCUMENTS

| | | | |
|---|---|---|---|
| 2007/0158128 A1* | 7/2007 | Gratz | B60R 25/252 |
| | | | 180/282 |
| 2015/0349959 A1 | 12/2015 | Marciniak | |
| 2016/0224776 A1 | 8/2016 | Leow | |
| 2020/0110870 A1 | 4/2020 | Girdhar et al. | |
| 2020/0162895 A1 | 5/2020 | Chakra et al. | |
| 2021/0213909 A1* | 7/2021 | Petersson | B60R 25/31 |

OTHER PUBLICATIONS

Stern, Marc; How Touch Activated Car Door Locks Work, Nov. 25, 2015 (Year: 2015).*
Freeman, Shanna; How OnStar Works, Feb. 2006 (Year: 2006).*
GM Authority Blog; Theft Alarm Notification; Dec. 3, 2020 (Year: 2020).*

* cited by examiner

| Lockout Counter | Lockout Action |
|---|---|
| 1-6 | Present rejection feedback, no lockout |
| 7 | Engage Lockout Mode A: 1-minute lockout with feedback |
| 8-9 | Present rejection feedback, no lockout |
| 10 | Engage Lockout Mode B: 5-minute lockout with feedback |
| 11, 13, 15 ... (every other) | Present rejection feedback, no lockout |
| 12, 14, 16 ... (every other) | Engage Lockout Mode C: 10-minute lockout with feedback |

Lockout Policy
202

| Lockout Action | Output |
|---|---|
| Dismiss | No change, lockout proceeds without interruption |
| Reset | Lockout state set to null |
| Unlock Vehicle | Override authentication state and unlock vehicle |
| Remote Start | Override authentication state and remote start vehicle |
| Lockdown | Set all authentication modalities to top lockout level, or no longer allow any authentications |

Administrative Actions
302

PROGRESSIVE LOCKOUT POLICY FOR DEVICELESS VEHICLE ACCESS AND REMOTE LOCKOUT MANAGEMENT INTERFACE

TECHNICAL FIELD

Aspects of the disclosure generally relate to a progressive lockout policy for deviceless vehicle access, as well as to a remote interface for managing lockout states.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. Passive entry passive start (PEPS) key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE), Ultra-Wide Band (UWB), or other mobile device wireless technologies.

Keypads may be positioned on the exterior of a vehicle and may also be used to lock and unlock the vehicle. The driver may unlock the door in response to successfully inputting a factory code on the keypad, which is a code including a sequence of numbers or other such characters. The driver may also use the factory code to program a new code, sometimes referred to as a personalized code, which may be easier to remember than the factory code and usable to unlock the vehicle with the keypad.

SUMMARY

In a first illustrative embodiment, a vehicle for improved user authentication is provided. The vehicle includes a biometric sensor and a controller having a hardware processor. The controller is programmed to initiate a biometric authentication of a user within a vicinity of a vehicle using data received from the biometric sensor, and responsive to occurrence of a secondary trigger condition initiated by the user to gain access to the vehicle, complete the authentication to grant or deny access to the user.

In a second illustrative embodiment, a vehicle implementing a progressive lockout is provided. A controller includes a hardware processor and is programmed to increment a first lockout counter responsive to occurrence of a failed access attempt using a first access modality, and prevent further authentication attempts to the vehicle using the first access modality for a first predefined period of time responsive to the first lockout counter reaching a first predefined value. The controller is also programmed to increment a second lockout counter responsive to occurrence of a second failed access attempt using a second access modality, and prevent further authentication attempts to the vehicle using the second access modality for a second predefined period of time responsive to the second lockout counter reaching a second predefined value.

In a third illustrative embodiment, a system for remote management of lockout states for a vehicle is provided. The server includes a hardware processor, programmed to receive a lockout notification from the vehicle, responsive to occurrence of a failed access attempt using an access modality, the lockout notification including contextual information with respect to the occurrence of the failed access attempt; and send, responsive to the lockout notification, an indication of an administrative action to be performed by the vehicle.

BRIEF DESCRIPTION OF THE DRAWINGS

FIG. 3 illustrates an example of administrative actions implemented by the cloud server in communication with the administrator device;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
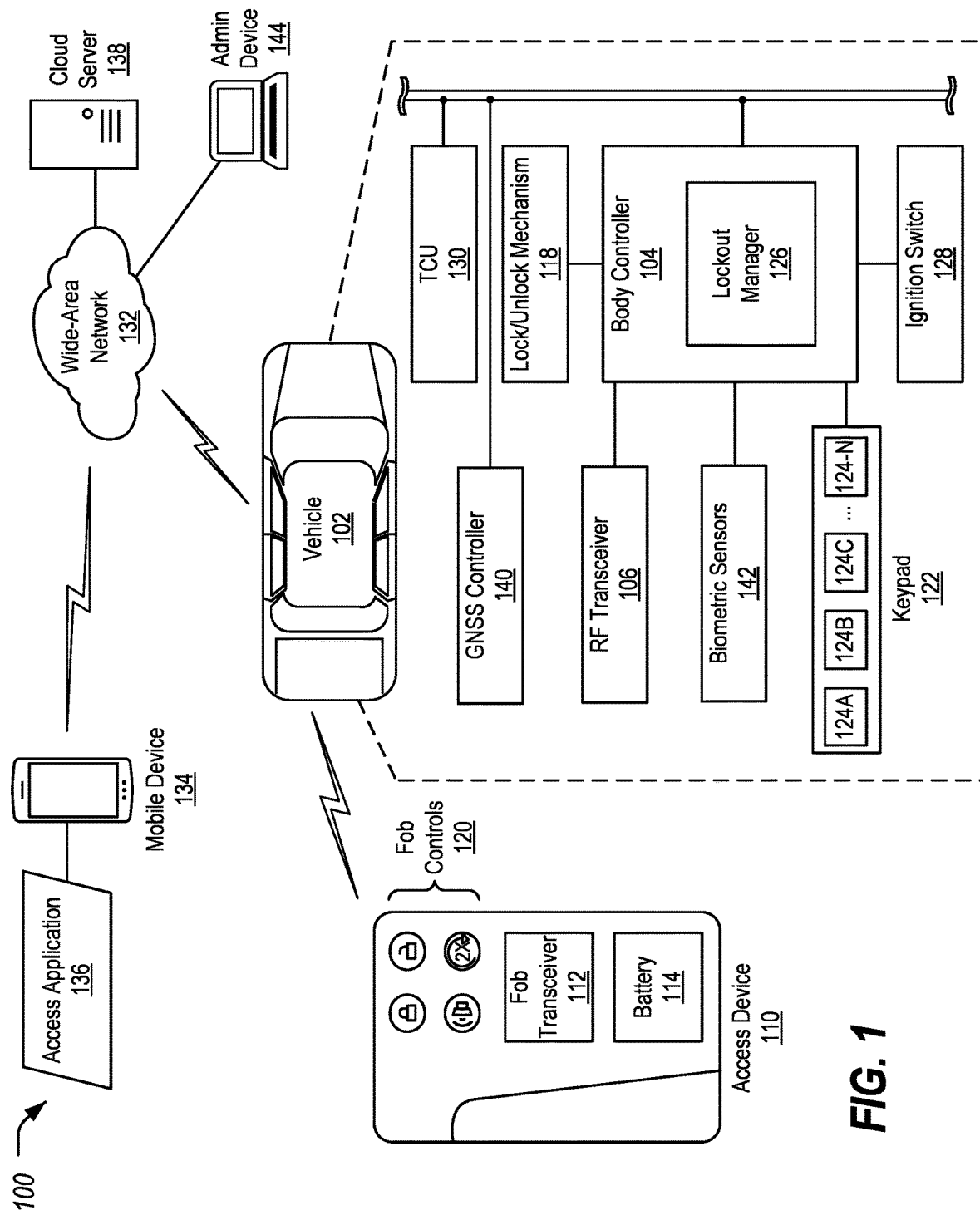
FIG. 1 illustrates an example keyless entry system for a progressive lockout policy for deviceless vehicle access, as well as to a remote interface for managing lockout states.

FIG. 1 illustrates an example keyless entry system 100 implementing a progressive lockout policy for deviceless vehicle 102 access, as well as a remote interface for managing lockout state. As referred to herein, a lockout state is a situation in which access to the vehicle 102 is denied, regardless of whether further access attempts are made or whether an authorized user is present. In many examples, lockouts are for a predefined period of time. However, it should be noted that in other examples, a lockout may be maintained until occurrence of a predefined action, such as release of the lockout via an administrator device 144.

Deviceless keys, such as biometrics or keypad authentication codes, give malicious users the possibility of doing brute force attacks to gain authentication. Traditional lockout methods may be used for keypad authentication, such as disablement after a predefined count of incorrect code entries. However, those approaches may be inapplicable for passive, camera-based biometrics, which present the possibility of unintentionally locking out the vehicle after a certain number of unrecognized faces walk by the camera-based sensors. Hence, the vehicle 102 may implement a policy to determine user intent to enter the vehicle 102, along with approaches for failure state for user intended requests, lockout duration, and lockout state reset. When a top lockout state is achieved (i.e., a complete lockout), the administrator device 144 may be notified via a cloud server 138. This can present the administrator device 144 with contextual information and a series of potential actions to be performed. These actions, for example, may allow for a reset of the lockout, allowing the administrator device 144 to grant immediate access, or may enforce a lockdown of additional authentication modalities to improve security.

The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a plug-in hybrid electrical vehicle (PHEV). Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 includes a body controller 104 in communication with a radio frequency (RF) transceiver 106. To gain access to the vehicle, an access device 110 in communication with the RF transceiver 106 utilizes an access transceiver 112 which may be powered by a battery 114. The body controller 104 may also be in communication a keypad 122, such that entry of a correct code into the keypad 122 grants access to the vehicle 102. The body controller 104 may also be in communication with biometric sensors 142 that may identify an authorized user of the vehicle 102 and grant access to the vehicle 102.

A lock/unlock mechanism 118 may be operably coupled to the controller 104. The controller 104 may be configured to control the lock/unlock mechanism 118 to unlock/lock doors of the vehicle 102 in response to the RF signals transmitted by the access device 110. The access device 110 may include one or more access controls 120, such as a lock switch and an unlock switch. Accordingly, the controller 104 may control the lock/unlock mechanism 118 to lock the doors of the vehicle 102 in response to a user depressing a lock access control 120 of the access device 110, and to unlock the doors of the vehicle 102 in response to the user depressing an unlock access control 120 of the access device 110.

The access device 110 may be implemented in connection with a base remote entry system, a PEPS system or a passive anti-theft system (PATS). With the PEPS system, the controller 104 may control the lock/unlock mechanism 118 to unlock the door in response to the controller 104 determining that the access device 110 is a predetermined distance away from the vehicle 102. In such a case, the access device 110 automatically (or passively) transmits encrypted RF signals (e.g., without user intervention) in order for the controller 104 to decrypt (or decode) the RF signals and to determine whether the access device 110 is within the predetermined distance and is authorized. With the PEPS implementation, the access device 110 also generates RF signals which correspond to encoded lock/unlock signals in response to a user depressing a lock access control 120 or an unlock access control 120. In addition, with the PEPS system, a physical key may not be needed to start the vehicle 102. The user in this case may be required to depress the brake pedal switch or perform some predetermined operation prior to depressing a start switch after the user has entered into the vehicle 102. In the PATS implementation, the access device 110 may operate as a conventional key fob in order to lock/unlock the vehicle 102. With the PATS implementation, a physical key blade (not shown) is generally needed to start the vehicle 102. The key may include a RF transmitter embedded therein to authenticate the key to the vehicle 102.

In another example, a mobile device 134 may include an access application 136 installed to a memory of the mobile device 134. The access application 136 may allow the user to utilize the mobile device 134 as an access device 110 to provide entry to the vehicle 102. In addition, the access application 136 may be able to receive information from the vehicle 102, e.g., transmitted from the vehicle 102 over the wide-area network 132 using a telematics control unit (TCU) 130. In an example, the access application 136 may allow the user to receive from the vehicle 102 information indicative of the position of the vehicle 102, which may be determined by the vehicle 102 using a global navigation satellite system (GNSS) controller 140.

It may be desirable, however, to provide for access to the vehicle 102 without requiring presence of an access device 110. For instance, such deviceless access may be accomplished using the keypad 122 and/or the biometric sensors 142.

The keypad 122 may be in electrical communication with the controller 104. The keypad 122 may be positioned on an exterior portion or section of the vehicle 102. In one example, the keypad 122 may be hardwired to the controller 104. In another example, the keypad 122 may be in RF communication with the controller 104. The keypad 122 includes a plurality of mechanical pads, or capacitive pads or other buttons 124a-124n which correspond to numeric characters, alpha characters or any combination of alpha-numeric characters. Thus, to enter a digit of an access code, such as a personal code or factory code, the user may simply touch or push the corresponding button 124.

In an example, the keypad 122 may transmit commands via hardwired signals to the controller 104 which correspond to a sequence of numeric characters, alpha characters, or alpha-numeric characters in response to the user selecting various buttons 124a-124n. In another example, the keypad 122 may transmit commands via RF signals which correspond to the alpha, numeric, or alpha-numeric characters to the controller 104 in response to the user selecting various buttons 124a-124n. The controller 104 may control the lock/unlock mechanism 118 to lock/unlock the doors in response to receiving the commands, e.g., two or more signals (RF or hardwired) which correspond to a valid sequence of alpha, numeric, or alpha-numeric characters.

The vehicle 102 may also include one or more biometric sensors 142. These may include, as some examples, a fingerprint scanner configured to identify a fingerprint, a camera configured to identify facial or other features, and/or an audio system configured to identify a voiceprint. In some examples, the biometric sensors 142 may be used to identify a user to provide access to the vehicle 102.

The controller 104 may include a lockout manager 126. The lockout manager 126 may be configured to authenticate an authentication request to enter and/or start the vehicle 102. For example, with the PATS implementation, the key is inserted into an ignition switch to start the vehicle 102. In such a case, the RF transmitter of the key transmits RF signals having encrypted data therein to the receiver of the lockout manager 126. The lockout manager 126 decrypts the data to authenticate the key prior to allowing the user to start the vehicle 102. With a PEPS implementation, as noted above, a key is not needed to be turned in a key cylinder to start the vehicle 102. In such a case, the lockout manager 126 may authenticate the RF encrypted data passively transmitted by the access transceiver 112 to allow the user access. With a keypad 122 implementation, the lockout manager 126 may validate that the keycode that was entered is a valid code to allow the user access. With biometric sensors 142, the lockout manager 126 may validate that the biometrics are valid to allow the user access.

Biometrics make for a seamless way of authenticating a user for vehicle access and/or start. As with access devices 110, a lockout policy may be implemented by the lockout manager 126 to reduce the odds of an attacker breaking in. For instance, for keypad 122 access, the lockout manager 126 may employ an anti-scan methodology, where thirty-five continuous incorrect button presses to the keypad 122 may result in a lockout of the keypad 122 for a predefined timeout. This may be done to prevent brute force attacks, such as a random number generator on a computer, but at the same time does not cause an undesirable customer experience.

However, because biometric authentication may be passively triggered, it may be difficult for the lockout manager 126 of the vehicle 102 to determine when a passive biometric analysis should be performed. For instance, with respect to camera-based biometric sensors 142 (such as face or iris scanners which identify people in a nearby vicinity to reduce latency), people that do not desire access to the vehicle 102 may appear in the field of vision of the biometric sensors 142. This can result in failed authentications if those unintending users are identified as failed authentication attempts. Implementing a lockout purely based upon a failed identification via the biometric sensors 142 may therefore cause many unnecessary lockouts, which has the likelihood to also inconvenience a customer who has returned to an inaccessible, locked-out vehicle 102.

Thus, in addition to the lockout manager 126 authenticating the RF encrypted data, keycode, and/or user biometrics, the user may be required to perform a predetermined operation (e.g., pull handle of a door, or open door, toggle the brake pedal switch, or other operation) request to enter and/or start the vehicle 102. These predetermined operations may be used as a trigger by the lockout manager 126 to perform a validation, and/or to ensure that the correct predetermined operation is performed as a portion of the user authentication.

The TCU 130 may include network hardware configured to facilitate communication between the vehicle and other devices of the keyless entry system 100. For example, the TCU 130 may include or otherwise access a cellular modem configured to facilitate communication with a wide-area network 132. The wide-area network 132 may include one or more interconnected communication networks such as the Internet, a cable television distribution network, a satellite link network, a local area network, and a telephone network, as some non-limiting examples. As another example, the TCU 130 may utilize one or more of BLUETOOTH, UWB, Wi-Fi, or wired universal serial bus (USB) network connectivity to facilitate communication with the wide-area network 132 via a user's mobile device 134.

The vehicle 102 may utilize the TCU 130 to communicate with a cloud server 138. The cloud server 138 may be an example of a networked computing device that is accessible to the vehicle 102 and/or the mobile device 134 over the wide-area network 132. The administrator device 144 is an example of a networked computing device that is accessible over the wide-area network 132. The cloud server 138 may be configured to receive communication from the vehicle 102 with respect to successful or unsuccessful authentications by the lockout manager 126, as well as communicate that information to the administrator device 144. The administrator device 144 may be accessible by an administrator to confirm and/or adjust any lockouts imposed by the lockout manager 126.

For instance, when a top lockout state occurs, this indicates a determination by the lockout manager 126 that one or more users have repeatedly and unsuccessfully tried to gain access. In the event of an attacker, a progressive back off would slow that user or users down, but such a policy may not necessarily restrict attempts for other modalities. For instance, the keypad 122 may be locked out, but an access device 110 or access via biometric sensors 142 may still be allowable.

In the case of a valid user, the user may have been locked out due to environmental conditions (e.g. authentication failures due to a camera being covered in rain). In such a scenario, the user may desire assistance, but due to relying on a deviceless solution for access, may not have the ability to request help. Hence, in addition to a progressive policy, the administrator device 144 may be useful for remote management of lockout states.

Figure 2:
FIG. 2 illustrates an example lockout policy implemented by the lockout manager of the vehicle.

FIG. 2 illustrates an example 200 of a lockout policy 202 implemented by the lockout manager 126 of the vehicle 102. In an example, data representative of the lockout policy 202 may be stored to a memory or other storage available to the body controller 104 for access by the lockout manager 126. As noted, the lockout manager 126 may be programmed to selectively control a progressive lockout. Moreover, this progressive lockout may operate independently for each modality (e.g., access device 110, keypad 122, biometric sensors 142, etc.). This approach may be utilized to avoid brute force attacks while minimizing risk of locking out a valid user.

In an example, lockouts may be implemented at a modality level, with control over duration and location. Meaning, a lockout may be isolated to a specific authentication technology being locked out. Thus, when a failed authentication rate for a specific authentication technology exceeds a given frequency threshold for a lockout (as defined by the lockout policy 202), the entire modality would be in a lockout state. There may include context logic for exterior versus interior lockouts. For example, an exterior lockout may not necessarily require a lockout of the vehicle 102 interior, whereas interior lockouts may, in an example, require locking out the exterior, or vice versa.

Thus, as noted above, a lockout may be present that does not prohibit all modalities. This would be the case if a modality is locked out (e.g., keycode vs biometrics), or an individual user is locked out (e.g., one biometric face recognition user vs all users of the vehicle 102 using biometric face recognition). In these scenarios, the associated confidence level required for the remaining valid authentication during lockouts may be increased. For example, if a first confidence level required for authentication during non-lockout conditions is 75%, the lockout manager 126 may raise the threshold to 85% during a first lockout level (e.g., Mode A), to 90% during a further lockout level (e.g., Mode B), and so on. The lockout manager 126 may also incorporate other requirements to increase confidence, such as removal of glasses, hats, hair in face, as some possibilities.

It should be noted that the lockout confidence adjustment may also incorporate location and historical behavior. For instance, a relative risk of presence of a malicious user (or lack thereof) may be used to bias the confidence adjustment on the biometric authentication implemented by the lockout manager 126. In one example, contextual data could be used, such as a risk of hackers in a given area as specified by the historical behavior data.

For key modalities that are continuously authenticating users, such as camera-based facial recognition, the lockout policy 202 may define a secondary trigger. For example, the lockout manager 126 may authenticate a user via facial recognition upon user approach (as the authentication may take some time), but the authorization check may not occur until the user grabs the door handle. Should the lockout manager 126 identify via facial recognition that the user is authorized, a seamless unlock may be granted. Should the lockout manager 126 identify via facial recognition that the user is unauthorized, the lockout policy 202 may be engaged. This enables a pre-authentication that increases the apparent speed of the authentication from the user perspective by reducing or eliminating processing delay for performing the authentication (as the biometric can be determined before the user performs the secondary trigger), while also reducing the risk of random bystanders automatically engaging the lockout.

Referring more specifically to the example lockout policy 202, each time there is a failed authentication associated with a given modality, a lockout counter may be incremented by one. The count of the lockout counter may further be associated with a lockout state, such that the lockout manager 126 may engage a given duration of lockout and the possibility of feedback with respect to the current lockout counter. It should be noted that user intent may operate as a trigger for passive technologies. That is, a random person walking by should not lock out facial recognition, and, for instance, a door handle grasp or other gesture would be used to key the performance of an authentication and potential increment of the lockout counter if the authentication fails.

As shown in the illustrated lockout policy 202 of FIG. 2, the $1^{st}$ through $6^{th}$ failed attempts in a modality may result in the presentation of rejection feedback (such as an indication that access is denied), but no further lockout action may be performed. However, on the $7^{th}$ failure, the lockout manager 126 may initiate Lockout Mode A, which engages a first lockout period during which no user authentication via the modality may be accepted (e.g., a one-minute timeout). Continuing with the illustrated example, the $8^{th}$ and $9^{th}$ failed attempts in the modality may result in the presentation of rejection feedback, but no further lockout action may be performed. However, upon the $10^{th}$ failed attempt, the lockout manager 126 may initiate Lockout Mode B, which engages a second lockout period during which no user authentication via the modality may be accepted (e.g., a five-minute timeout or other period of time longer than the first logout period). Then, the illustrated lockout policy 202 for each additional lockout attempt may alternate between the presentation of rejection feedback and initiating Lockout Mode C, which engages a third lockout period during which no user authentication via the modality may be accepted (e.g., a ten-minute timeout or other period of time longer than the second logout period).

Thus, the example lockout policy 202 increases the timeout duration as well as the frequency of timeouts as failed attempts accrue on the lockout counter. Accordingly, in this example as the number of failed attempts increase, the lockout duration increases and the lockout becomes more sensitive to authentication failures. It should be noted that this is merely an example, and different approaches to the lockout policy 202 are possible. For instance, in one example, the frequency of the timeouts may be increased but not their duration. Or, the duration of the timeouts may be increased but not their frequency.

Moreover, lockout engagement may consider the identification of personal devices that are not keys. For example, a user's device (smartphone, wearable, etc.) being detected as close based on a high signal strength (e.g., Received Signal Strength Indicator (RSSI)) or a short distance (e.g., Round Trip Time-of-Flight (ToF) duration) by the vehicle 102 may indicate an increased likelihood of a valid user being nearby. This may also incorporate the supplemental usage of potentially non-determinative but useful biometrics, such as speaker and gait recognition, as well as behavior recognition (e.g., time of day, location, etc., aligning with typical behaviors).

Responsive to the lockout manager 126 causing the vehicle 102 to enter into a higher lockout mode or level, a progressive alert mechanism can be adapted. For instance, in Lockout Mode C, a full-force alert mechanism may be activated such as sounding an alarm system of the vehicle 102, flashing lights of the vehicle 102, etc. to fend off future attempts and also attract attention of people in the vicinity of the vehicle 102. If no activity is detected for a chosen duration, such an alarm may be deactivated, even though lockout mode may remain active.

As another possibility, suspicious events other than failed authentication may be used to increase the lockout state. For example, if a malicious user breaks a window and/or causes vibrations detected by sensors of the vehicle 102, all of the starting modalities can immediately skip from zero to the highest, top lockout mode. In this scenario, the exterior access modalities may not be locked out. Additionally, a valid exterior authentication may reset an interior lockout due to this enhancement (as it could be a valid user who accidentally triggered the vibration detection).

The lockout counter may automatically reset responsive to the lockout manager 126 confirming that a valid authentication is made. This may be specific to the modality or may be generalized to any modality and reset all modalities. A timeout may also be implemented, such as automatically resetting all counters to zero after a predefined period of inactivity (e.g., no authentication attempts are considered within 10 minutes).

It should be noted that, as a security measure, the timeout may be excluded for the top lockout modality. That is, when in the highest state (e.g., Lockout Mode C in the illustrated lockout policy 202), only a valid authentication or an authorized lockout reset request may be used reset the lockout counters. That is, the lockout reset request could be performed remotely or as service routine via the cloud server 138 and/or via the administrator device 144. This may accordingly enforce a high back-off policy for those that are continuously attacking the vehicle 102.

FIG. 3 illustrates an example 300 of administrative actions 302 implemented by the cloud server 138 in communication with the administrator device 144. In general, the cloud server 138 may implement a lockout notification approach where an administrator device 144 may be able to exercise remote control of the vehicle 102 authentication. The vehicle 102 may push either select or all lockout state information to the cloud server 138 for tracking purposes. When specific conditions are met, such as the vehicle 102 entering the top lockout state, the cloud server 138 may send the administrator device 144 a notification. This may, for example, allow the administrator device 144 to inform an administrator of the vehicle 102 of the event.

The notification may contain relevant contextual information. The contextual information may include, as some examples, a location of the vehicle 102, a time of the last attempted access to the vehicle 102, a last known user of the vehicle 102. In some examples, the contextual information may include camera feed data (e.g., from the biometric sensors 142) of which sensor triggered the lockout (e.g., a driver door camera biometric sensor 142 triggered the lockout). (It should be noted that vehicle camera feed data may be provided in some implementations regardless of what triggered the lockout.) The contextual information may also include a time-stamped log of each recent successful/failed attempt, paired with vehicle 102 status and modality, such as fingerprint access or door handle access. For example, if the administrator using the administrator device 144 identifies exterior access failures, with the vehicle 102 lock state remaining locked, followed by an interior lockout, this could indicate someone has broken into the vehicle 102.

The lockout notification can also contain information about the predicted user. For instance, if a facial recognition performed by the vehicle 102 indicates presence of a first user (e.g., John), but the user was rejected by an anti-spoofing function of the vehicle 102, this rejection may be conveyed to the administrator. Additionally, or alternately, the cloud server 138 may relay a notification from the vehicle 102 to the mobile device 134 of the user being denied access, even if that user is not an administrator.

The lockout notification may be achieved over the wide-area network 132 via multiple remote interfaces such as Web application programming interfaces (APIs), short message service (SMS) text messaging, another text messaging protocol, a phone voice call, e-mail, or a combination of interfaces. The mode of sending the notification may depend on the user preference and/or on mobile settings, such as airplane mode, disabled internet, presence or absence of a Wi-Fi connection, etc. If no service for receiving notifications is detected (e.g., by the mobile device 134 of the user), then the user may be notified to activate the required services to allow the user to have the ability to receive notifications.

Referring more specifically to the administrative actions 302, the administrator device 144 be provided with an administrative notification when the cloud server 138 is notified of a lockout. In an example, the administrative notification may indicate which administrative actions 302 are available with respect to the lockout. These administrative actions 302 may be presented to the administrative user of the administrator device 144. The administrator may select from the available administrative actions 302, and the administrator device 144 may return an indication of the selection option to the cloud server 138. This selection may be implemented by the cloud server 138, e.g., through messaging back to the vehicle 102.

The administrative actions 302 as shown describes some of the associated actions to be taken. For instance, one option may be a dismiss lockout action, which would have no change on the lockout as specified by the lockout policy 202, and the lockout may proceed without interruption. Another option may be a reset lockout action, which may cause the cloud server 138 to message the vehicle 102 to reset the lockout counter back to zero. Yet another option may be a remote unlock action, which may cause the cloud server 138 to message the vehicle 102 to unlock. Yet a further option may be a remote start action, which may cause the cloud server 138 to message the vehicle 102 to start. Another option may be a lockdown action, which may cause the cloud server 138 to message the vehicle 102 to one or more of set all authentication modalities to top lockout level for the vehicle 102, or no longer allow any authentications by the vehicle 102.

It should be noted that these actions are merely examples, and more, fewer, and different options may be used. It should also be noted that these actions could have intermediary states, such as unlock driver door vs unlock all doors, and lockdown biometrics authentication vs lockdown all modalities of authentication.

In some instances, the administrator may be unavailable for immediate response, and may elect to set up the cloud server 138 to implement an auto-response to the vehicle 102 for lockouts after a timeout period of no response. This may include either a designated backup account holder who may get elevated privileges temporarily, or may be a pre-set of actionable items based on context. Examples of contextual auto-actions could be automatic reset of lockout based off location (e.g., the vehicle 102 being at the residence of the main user) or a familiar device being connected to the vehicle 102 (e.g., a wearable, phone, etc., indicative of presence of an authorized user), or transmission of an access code to a trusted user account for access.

Figure 4:
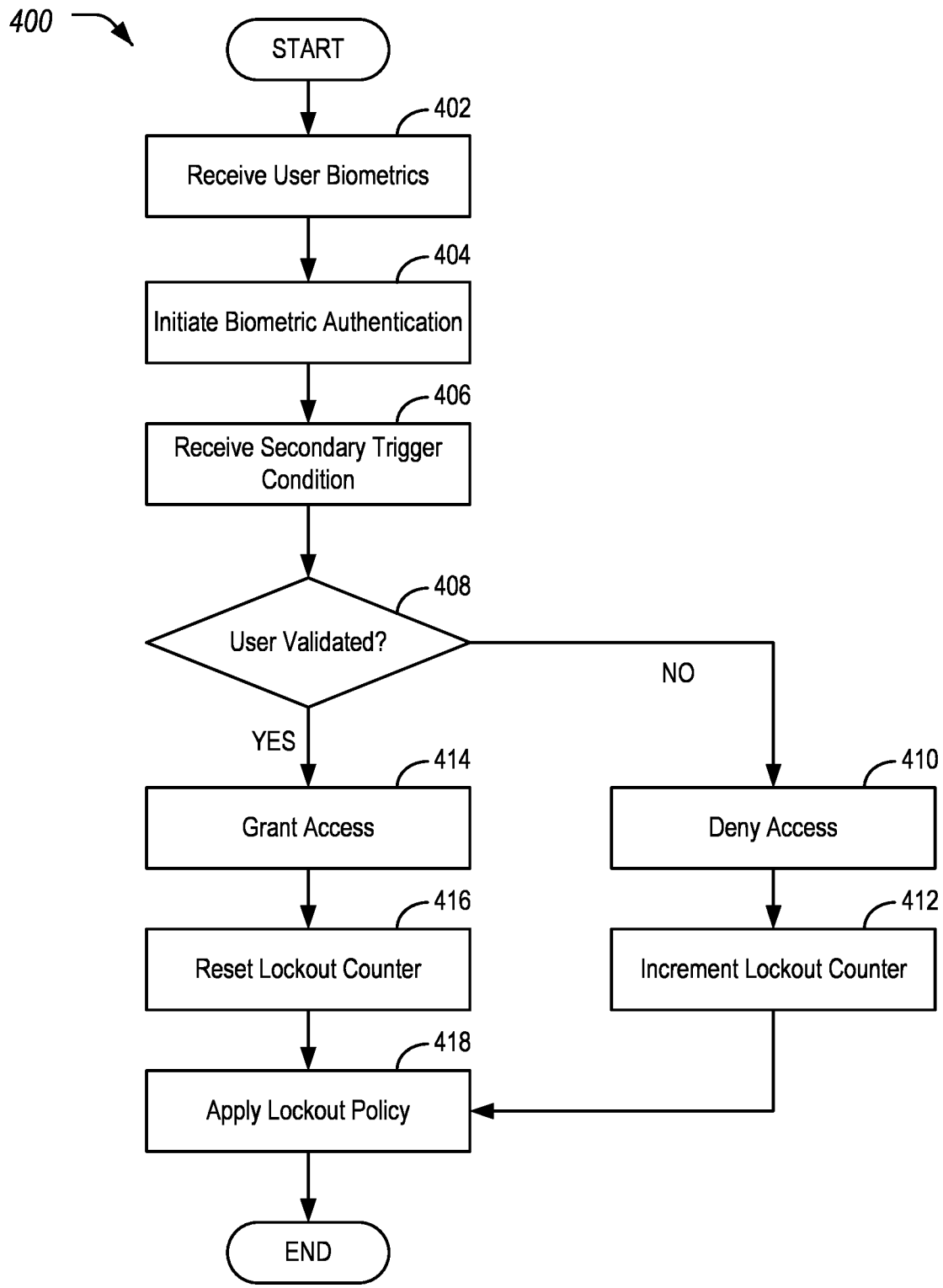
FIG. 4 illustrates an example process for improved biometric user authentication via a secondary trigger condition.

FIG. 4 illustrates an example process 400 for improved biometric user authentication via a secondary trigger condition. In an example, the process 400 may be performed by the vehicle 102 in the context of the keyless entry system 100. It should be noted that while the process 400 is illustrate linearly, the process 400 may be performed continuously, and one or more operations of the process 400 may be performed concurrently.

At operation 402, the vehicle 102 receives user biometrics. For instance, the vehicle 102 may receive data from the biometric sensors 142 of the vehicle 102. This data may include, as some examples, passive camera-based biometrics from a visual biometric sensor 142, fingerprint data from a touch biometric sensor 142, voiceprint data from an audio biometric sensor 142, etc.

At operation 404, the vehicle 102 initiates biometric authentication. In an example, responsive to receipt of the user biometrics from operation 402, the vehicle 102 attempts to compare the received biometrics to stored biometrics of a valid user.

At operation 406, the vehicle 102 receives a secondary trigger condition. In an example, the secondary trigger condition is the user moving an appendage towards or onto a door handle of the vehicle 102.

At operation 408, the vehicle 102 determines whether the user is validated. In an example, the biometric authentication initiated at operation 404 is complete before occurrence of the secondary trigger condition at operation 406. In another example, the biometric authentication initiated at operation 404 is not complete and the determination is completed at operation 408. In either case, a result of the biometric authentication is used to determine whether to proceed to operation 410 to deny access to the user, or to proceed to operation 414 to grant access to the user.

At operation 410, the vehicle 102 denies access to the user. This may include, as some examples, keeping the vehicle 102 in a locked state to deny the user entrance to the vehicle 102, and/or preventing the vehicle 102 from being started. After operation 410, control passes to operation 412 to increment the lockout counter. In many examples, each modality for access may have its own lockout counter. Thus, if a camera-based biometric fails, then a camera-based modality lockout counter may be incremented. In other examples, the lockout timers may be less specific, and for example a lockout counter may be used for all types of biometrics, and a second lockout counter may be used for keypad lockouts, for example.

At operation 414, taking the other branch form operation 408, the vehicle 102 grants access to the user. This may include, as some examples, unlocking the vehicle 102 to provide the user entrance to the vehicle 102, and/or starting the vehicle 102. After operation 414, control passes to operation 416 to reset the lockout counter. The reset may be to set the lockout counter back to zero, for example.

After either of operations 412 or 416, control passes to operation 418. At operation 418, the vehicle 102 applies the lockout policy 202. This may include, as discussed above, application of a lockout state or level, such that the lockout manager 126 may, based on the updated value of the lockout counter, engage a given duration of lockout, provide the possibility of feedback, and/or send a lockout notification to the cloud server 138. An example implementation of application of the lockout policy 202 is discussed with respect to FIG. 5 below. After operation 418, the process 400 ends.

Figure 5:
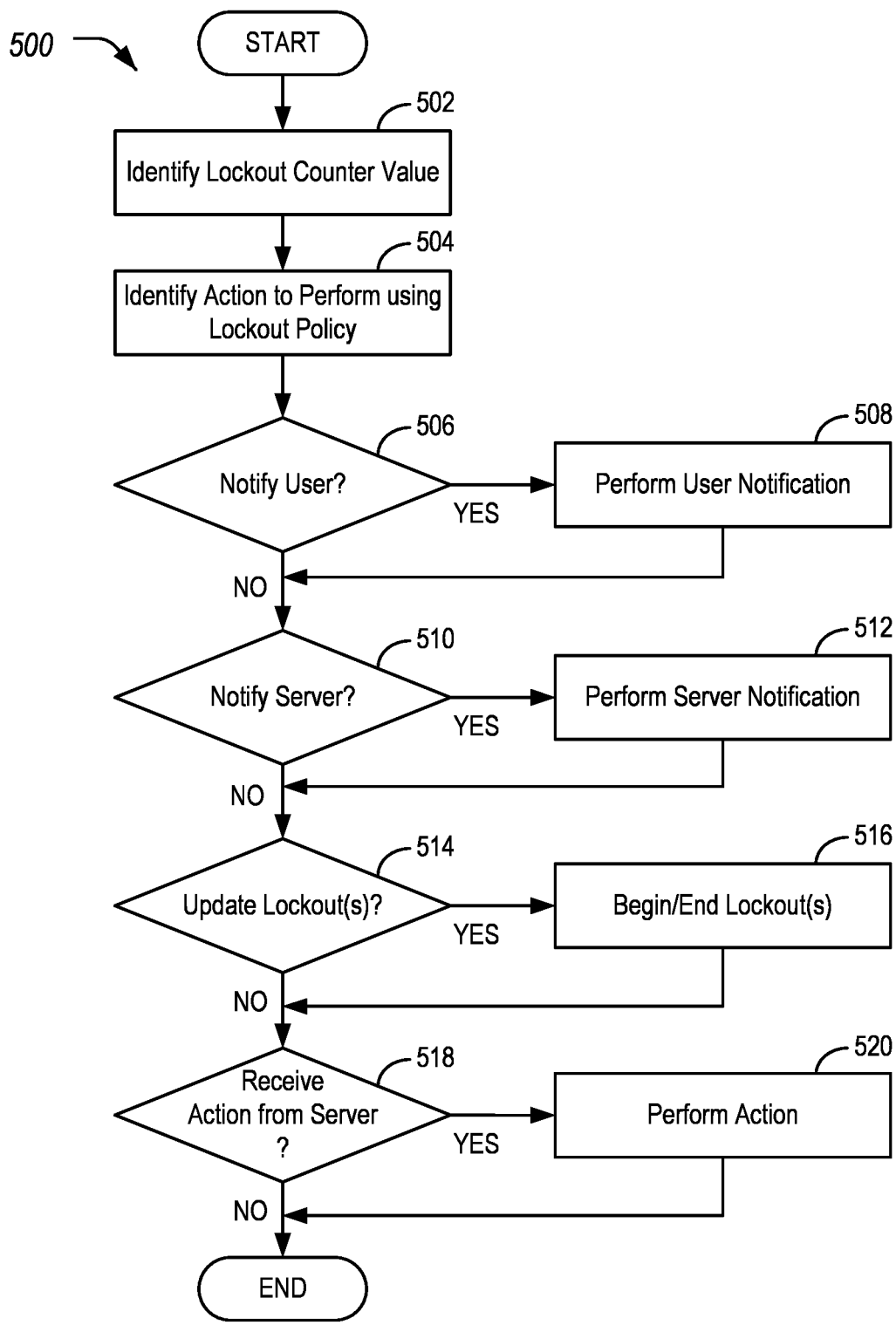
FIG. 5 illustrates an example process for operation of the lockout policy by the vehicle.

FIG. 5 illustrates an example process 500 for operation of the lockout policy 202 by the vehicle 102. In an example, the process 500 may be performed by the vehicle 102 with respect to operation 418 of the process 400. In other examples, the process 500 may be performed by the vehicle 102 based on other authentication approaches independent of that of process 400. As with the process 400, while the process 500 is illustrate linearly, the process 500 may be performed continuously, and one or more operations of the process 500 may be performed concurrently.

At operation 502, the vehicle 102 identifies a lockout counter value. As some examples, the vehicle 102 may identify the lockout value responsive to an increment of the lockout value or a reset of the lockout counter back to zero.

At operation 504, the vehicle 102 access the lockout policy 202 to identify an action to take responsive to the new value of the lockout counter. For instance, for each value of the lockout counter the lockout policy 202 may specify one or more of wither to engage a given duration of lockout, to provide feedback to the user attempting authentication, and/or to send a lockout notification to the cloud server 138. In some cases, the lockout notification to the cloud server 138 is always attempted, regardless of the lockout policy 202.

At operation 506, the vehicle 102 determines whether the identified action includes to notify the user. If so, control passes to operation 508 to perform the notification. This notification may include, as some examples, displaying a message with respect to the authentication being approved or denied, provide an audible indication with respect to the authentication being approved or denied, imitate the vehicle 102 alarm, etc. After operation 508, or if no notification is indicated at operation 506, control passes to operation 510.

At operation 510, the vehicle 102 determines whether the identified action includes to notify the cloud server 138. If so, control passes to operation 512 to send lockout notification to the cloud server 138. Further aspects of the lockout notification are discussed above. After operation 512, or if no notification is indicated at operation 510, control passes to operation 514.

At operation 514, the vehicle 102 determines whether the identified action includes to update a vehicle 102 lockout. If so, control passes to operation 516. For instance, responsive to an increment to the lockout counter, further authentications from the modality that failed may be ignored for a predefined period of time. or, responsive to a reset of the lockout counter, further authentications from the modality (or form other modalities) may again be processed by the vehicle 102. Further aspects of the lockout counter are discussed above. After operation 516, or if no notification is indicated at operation 512, control passes to operation 518.

At operation 518, the vehicle 102 determines whether an action is received from the cloud server 128. If so, control passes to operation 520. For instance, responsive to the lockout notification sent at operation 512, the vehicle 102 may receive an indication to override the actions specified by the lockout policy 202. This may include, for example, to reset the lockout counter, to lock out the vehicle 102, to allow access to the vehicle 102, to start the vehicle 102, etc. Further aspects of the actions received form the cloud server 138 are discussed in detail above. After operation 520, or if no action is received at operation 518, the process 500 ends.

Figure 6:
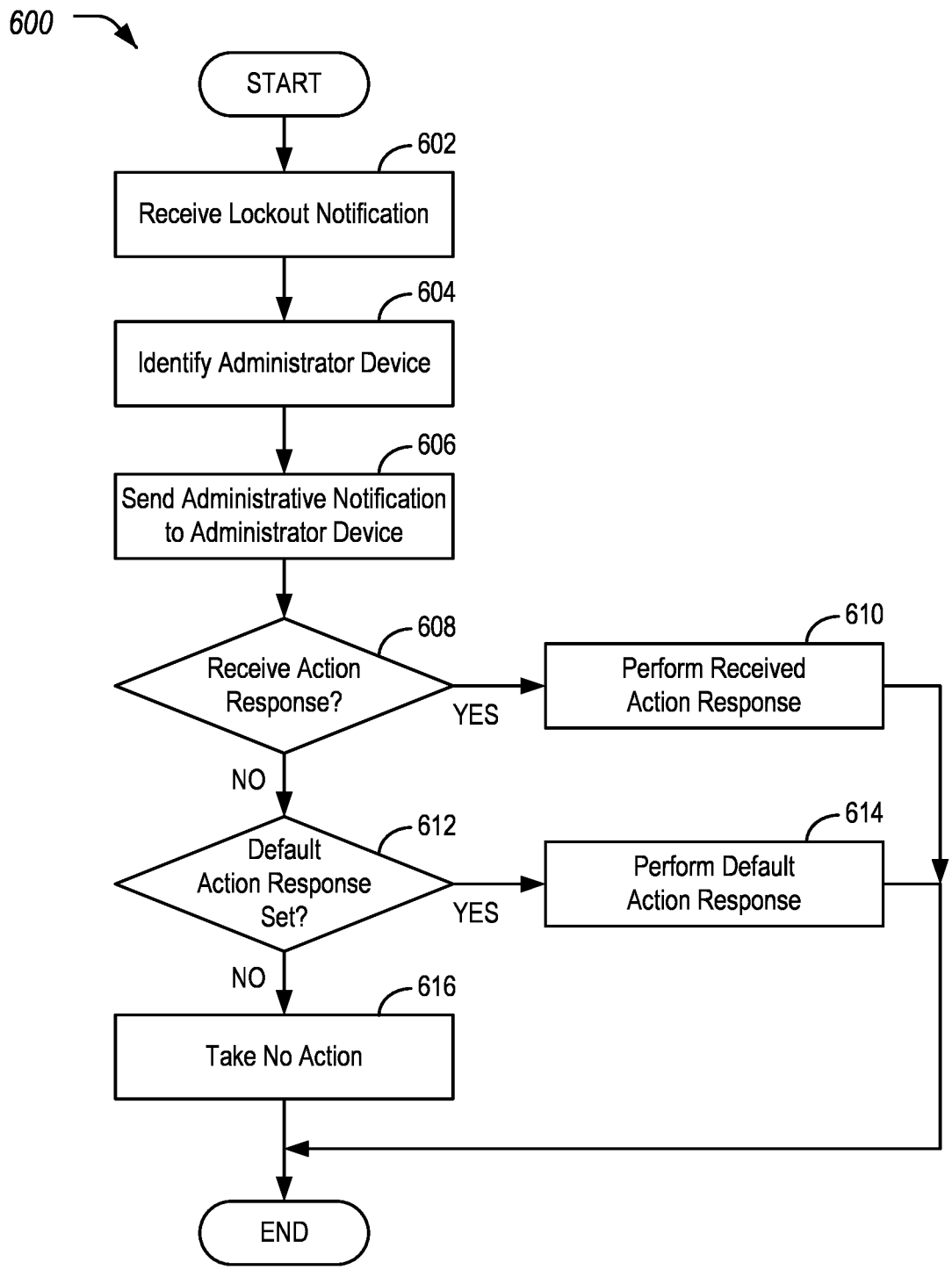
FIG. 6 illustrates an example process for operation of the administrative actions by the cloud server.

FIG. 6 illustrates an example process 600 for operation of the administrative actions 302 by the cloud server 138. In an example, the process 600 may be performed responsive to receipt of a lockout notification at operation 602 received from the vehicle 102 in operation 512 of the process 500. In other examples, the lockout notification may be received to the cloud server 138 independent of the process 500. As with the processes 400 and 500, the operations of the process 600 may also be performed continuously and/or concurrently.

Regardless, at operation 604 the cloud server 138 identifies the administrator device 144 that corresponds to the vehicle 102. In an example, the cloud server 138 may maintain a mapping of vehicles 102 to corresponding administrator devices 144, e.g., fleet managers for the vehicles 102. In another example, the cloud server 138 may be specific to a fleet and may be programmed to send to a set of one or more administrator devices 144 regardless of vehicle 102.

At operation 606, the cloud server 138 sends an administrative notification message to the administrator device(s) 144. In an example, the administrative notification may indicate which administrative actions 302 are available with respect to a vehicle 102 lockout. Examples of the administrative actions 302 are discussed above.

At operation 608, the cloud server 138 determines whether an action response was received. For instance, the administrative actions 302 indicated at operation 606 may be presented to the administrative user of the administrator device 144. The administrator may select from the available administrative actions 302, and the administrator device 144 may return an indication of the selection option to the cloud server 138. If such an action response is received, control passes to operation 610 to perform the action in the received action response. This performance may include sending a command to the vehicle 102, e.g., to override the lockout, to institute a further lockout, to unlock vehicle 102 doors, to start the vehicle 102, etc. After operation 610 the process 600 ends.

If, however, no action response was received at operation 608 (e.g., within a predefined timeout period such as a minute, an hour, etc.), control passes to operation 612 to determine whether a default action response was set. In some examples, the administrator device 144 may be used to set a default action that is to be performed to override the lockout policy 202, even if the administrator device 144 not provide a response at operation 608. If so, control passes to operation 614 to perform the default action. After operation 614, the process 600 ends.

If, however, no default action is set at operation 612, and also no action response is received at operation 608, control passes to operation 616 to take no action with respect to the lockout notification received at operation 602. After operation 616, the process 600 ends.

Variations on the process 600 are possible. For instance, if a default action is set, then that action may be performed unless or until an action response is received from the administrator device 144. In yet another variation, an action response may be received and processed by the cloud server 138 to operate on the vehicle 102 regardless of wither a lockout notification is received.

Computing devices described herein, such as the body controller 104, access device 110, mobile device 134, and cloud server 138, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, structured query language (SQL), etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle for improved user authentication comprising:
a biometric sensor; and
a controller having a hardware processor, programmed to:
initiate a biometric authentication of a user within a vicinity of the vehicle using data received from the biometric sensor,
responsive to receipt of a secondary trigger condition initiated by the user to gain access to the vehicle, complete the biometric authentication to grant or deny access to the user, and
update a lockout counter of the vehicle based on the biometric authentication responsive to the receipt of the secondary trigger condition, thereby reducing a risk of bystanders inadvertently increasing the lockout counter.

2. The vehicle of claim 1, wherein the processor is further programmed to:
increment the lockout counter responsive to a denial of access; and
prevent further authentication attempts to the vehicle using the biometric sensor for a predefined period of time responsive to the lockout counter reaching a predefined value.

3. The vehicle of claim 1, wherein the biometric authentication is completed prior to the receipt of the secondary trigger condition, thereby reducing processing delay to grant or deny access.

4. The vehicle of claim 1, wherein the biometric sensor is configured to capture facial imaging data, and the biometric authentication is a facial recognition using the facial imaging data.

5. The vehicle of claim 1, wherein the secondary trigger condition is the user moving an appendage towards a door handle of the vehicle.

6. A vehicle implementing a progressive lockout, comprising:
a controller having a hardware processor, programmed to:
increment a first lockout counter responsive to occurrence of a first failed access attempt using a first access modality;
prevent further authentication attempts to the vehicle using the first access modality for a first predefined duration responsive to the first lockout counter reaching a first predefined value;
increment a second lockout counter responsive to occurrence of a second failed access attempt using a second access modality;

prevent further authentication attempts to the vehicle using the second access modality for a second predefined duration responsive to the second lockout counter reaching a second predefined value;

reset the first lockout counter but not the second lockout counter responsive to occurrence of a successful access attempt using the first access modality; and reset the second lockout counter but not the first lockout counter responsive to occurrence of a successful access attempt using the second access modality.

7. The vehicle of claim 6, wherein the first access modality is use of biometric authentication, and the second access modality is use of a hardware access device or code.

8. The vehicle of claim 6, wherein the controller is further programmed to one or more of: (i) increase lockout duration as the first lockout counter increases, or (ii) reduce a count of failed authentication attempts between lockouts as the first lockout counter increases.

9. The vehicle of claim 6, wherein the controller is further programmed to:

send a lockout notification, responsive to the occurrence of the first failed access attempt using either the first access modality or the second access modality, the lockout notification including contextual information with respect to the occurrence of the first failed access attempt;

receive, responsive to the send of the lockout notification, an indication of an administrative action to be performed by the vehicle; and perform the administrative action.

10. The vehicle of claim 9, wherein the contextual information includes one or more of: (i) a location of the vehicle, (ii) a time of a last attempted access to the vehicle, (iii) a last known user of the vehicle, (iv) image data that triggered the lockout notification, or (v) a time-stamped log of each recent successful or failed access attempt to the vehicle.

11. A vehicle implementing a progressive lockout, comprising:

a controller having a hardware processor, programmed to:
increment a first lockout counter responsive to occurrence of a first failed access attempt using a first access modality;

prevent further authentication attempts to the vehicle using the first access modality for a first predefined duration responsive to the first lockout counter reaching a first predefined value;

increment a second lockout counter responsive to occurrence of a second failed access attempt using a second access modality;

prevent further authentication attempts to the vehicle using the second access modality for a second predefined duration responsive to the second lockout counter reaching a second predefined value; and reset the first lockout counter and the second lockout counter responsive to occurrence of a successful access attempt using the first access modality.

12. The vehicle of claim 11, wherein the first access modality is use of biometric authentication, and the second access modality is use of a hardware access device or code.

13. The vehicle of claim 11, wherein the controller is further programmed to one or more of: (i) increase lockout duration as the first lockout counter increases, or (ii) reduce a count of failed authentication attempts between lockouts as the first lockout counter increases.

14. The vehicle of claim 11, wherein the controller is further programmed to:

send a lockout notification, responsive to the occurrence of the first failed access attempt using either the first access modality or the second access modality, the lockout notification including contextual information with respect to the occurrence of the first failed access attempt;

receive, responsive to the send of the lockout notification, an indication of an administrative action to be performed by the vehicle; and perform the administrative action.

15. The vehicle of claim 14, wherein the contextual information includes one or more of: (i) a location of the vehicle, (ii) a time of a last attempted access to the vehicle, (iii) a last known user of the vehicle, (iv) image data that triggered the lockout notification, or (v) a time-stamped log of each recent successful or failed access attempt to the vehicle.

16. A vehicle implementing a progressive lockout, comprising:

a controller having a hardware processor, programmed to:
increment a first lockout counter responsive to occurrence of a first failed access attempt using a first access modality;

prevent further authentication attempts to the vehicle using the first access modality for a first predefined duration responsive to the first lockout counter reaching a first predefined value;

increment a second lockout counter responsive to occurrence of a second failed access attempt using a second access modality;

prevent further authentication attempts to the vehicle using the second access modality for a second predefined duration responsive to the second lockout counter reaching a second predefined value; and prevent further authentication attempts to the vehicle using the first access modality for a third predefined duration responsive to the first lockout counter reaching a third predefined value, the third predefined duration being greater than the first predefined duration, the third predefined value being greater than the first predefined value.

17. The vehicle of claim 16, wherein the first access modality is use of biometric authentication, and the second access modality is use of a hardware access device or code.

18. The vehicle of claim 16, wherein the controller is further programmed to one or more of: (i) increase lockout duration as the first lockout counter increases, or (ii) reduce a count of failed authentication attempts between lockouts as the first lockout counter increases.

19. The vehicle of claim 16, wherein the controller is further programmed to:

send a lockout notification, responsive to the occurrence of the first failed access attempt using either the first access modality or the second access modality, the lockout notification including contextual information with respect to the occurrence of the first failed access attempt;

receive, responsive to the send of the lockout notification, an indication of an administrative action to be performed by the vehicle; and perform the administrative action.

20. The vehicle of claim 19, wherein the contextual information includes one or more of: (i) a location of the vehicle, (ii) a time of a last attempted access to the vehicle, (iii) a last known user of the vehicle, (iv) image data that triggered the lockout notification, or (v) a time-stamped log of each recent successful or failed access attempt to the vehicle.

\* \* \* \* \*